(12) United States Patent
Rathwell

(10) Patent No.: US 10,695,802 B2
(45) Date of Patent: Jun. 30, 2020

(54) SUCTION NOZZLE FOR USE WITH LIQUID

(71) Applicant: Jim Rathwell, Victoria (CA)

(72) Inventor: Jim Rathwell, Victoria (CA)

(73) Assignee: BEARSPAW SEPARATORS INC, Victoria, BC (CA)

( * ) Notice: Subject to any disclaimer, the term of this patent is extended or adjusted under 35 U.S.C. 154(b) by 316 days.

(21) Appl. No.: 15/884,931

(22) Filed: Jan. 31, 2018

(65) Prior Publication Data

US 2019/0009308 A1    Jan. 10, 2019

(30) Foreign Application Priority Data

Jul. 5, 2017 (CA) ..................... 2972512

(51) Int. Cl.
| | |
|---|---|
| *B08B 3/02* | (2006.01) |
| *A47L 7/00* | (2006.01) |
| *A47L 9/24* | (2006.01) |
| *B65G 53/30* | (2006.01) |
| *F15D 1/00* | (2006.01) |

(52) U.S. Cl.
CPC ............ *B08B 3/024* (2013.01); *A47L 7/0009* (2013.01); *A47L 9/242* (2013.01); *B65G 53/30* (2013.01); *F15D 1/008* (2013.01); *B08B 2203/0229* (2013.01)

(58) Field of Classification Search
CPC ..... A47L 7/0009; A47L 7/0014; A47L 7/0019
See application file for complete search history.

(56) References Cited

U.S. PATENT DOCUMENTS

| | | |
|---|---|---|
| 3,039,122 A | 6/1962 | Birdsall |
| 3,206,036 A | 9/1965 | Hawley |
| 3,782,552 A | 1/1974 | Wendell |
| 2008/0061010 A1 | 3/2008 | Tom |
| 2010/0192980 A1* | 8/2010 | Turner ................... A47L 5/365 134/21 |

OTHER PUBLICATIONS

Chilean Office Action issued in corresponding Chilean Patent Application No. 201801832 dated Aug. 8, 2019.

* cited by examiner

*Primary Examiner* — Andrew A Horton
(74) *Attorney, Agent, or Firm* — Davis & Bujold PLLC; Michael J. Bujold

(57) ABSTRACT

A suction nozzle which has a suction chamber with an underlying sump. The suction chamber is defined by a chamber top, a chamber bottom and a peripheral sidewall. Suction draws liquids through the inflow openings in the peripheral sidewall into the suction chamber. The sump underlies the suction chamber. Particles and denser liquids drawn toward the suction chamber tend to migrate along the sump top, passing down sloped surfaces and through a central inlet into the sump.

4 Claims, 4 Drawing Sheets

SUCTION NOZZLE FOR USE WITH LIQUID

FIELD

There is described a suction nozzle which is used when a vacuum source suctions liquids through a hose.

BACKGROUND

When a vacuum source is used to suction liquids by inserting a suction nozzle into a pond, the force of the suction upon the suction nozzle inevitably draws sediment from the bottom of the pond. In some applications, the drawing of sediment is of no material consequence. In other applications, solids in the liquid creates an undesirable problem. In the oil and gas industry having solids in the captured liquid increases the cost of disposal, as many disposal sites accept liquid only. In firefighting applications having solids in the liquids is abrasive and can, over time, adversely affect seals in pumps and other equipment. In environmentally sensitive areas stirring up sediment on the bottom of the body of water causes environmental damage.

SUMMARY

There is provided a suction nozzle which has a suction chamber with an underlying sump. The suction chamber is defined by a chamber top, a chamber bottom and a peripheral sidewall. The peripheral sidewall has inflow openings. The chamber top has a suction opening terminating with a hose coupling, whereby a hose from a vacuum source is connected to provide suction to draw liquids through the inflow openings in the peripheral sidewall into the suction chamber. The sump underlies the suction chamber. The sump has a sump top and a sump bottom. The sump top has sloped surfaces inclined downwardly toward a central inlet. The sump bottom is spaced from the sump top to define peripheral outlets between the sump top and the sump bottom. The sump top extends past the chamber bottom thereby forming a migration path. The sump top is in spaced relation to the chamber bottom thereby providing a peripheral entryway into the sump. Particles and denser liquids drawn toward the suction chamber tend to migrate along the sump top, passing through the entryway, down the sloped surfaces and dropping through the central inlet into the sump. The particles and denser liquid exit the sump through the peripheral outlets in response to a continuous flow into the sump.

As will hereinafter be further described, the suction nozzle described above is able to draw liquid from a body of water with minimal disturbance. Any sediment that is drawn toward the inflow opening of the suction chamber has a greater density and, therefore, tends to migrate along the extended sump top and into the sump, not into the suction chamber.

As will hereafter be further described, when a float system is added to the suction nozzle, the suction nozzle is capable of skimming one liquid having a first density from a surface of a body of liquid having a second density. For example, oil can be skimmed from the surface of a body of water.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
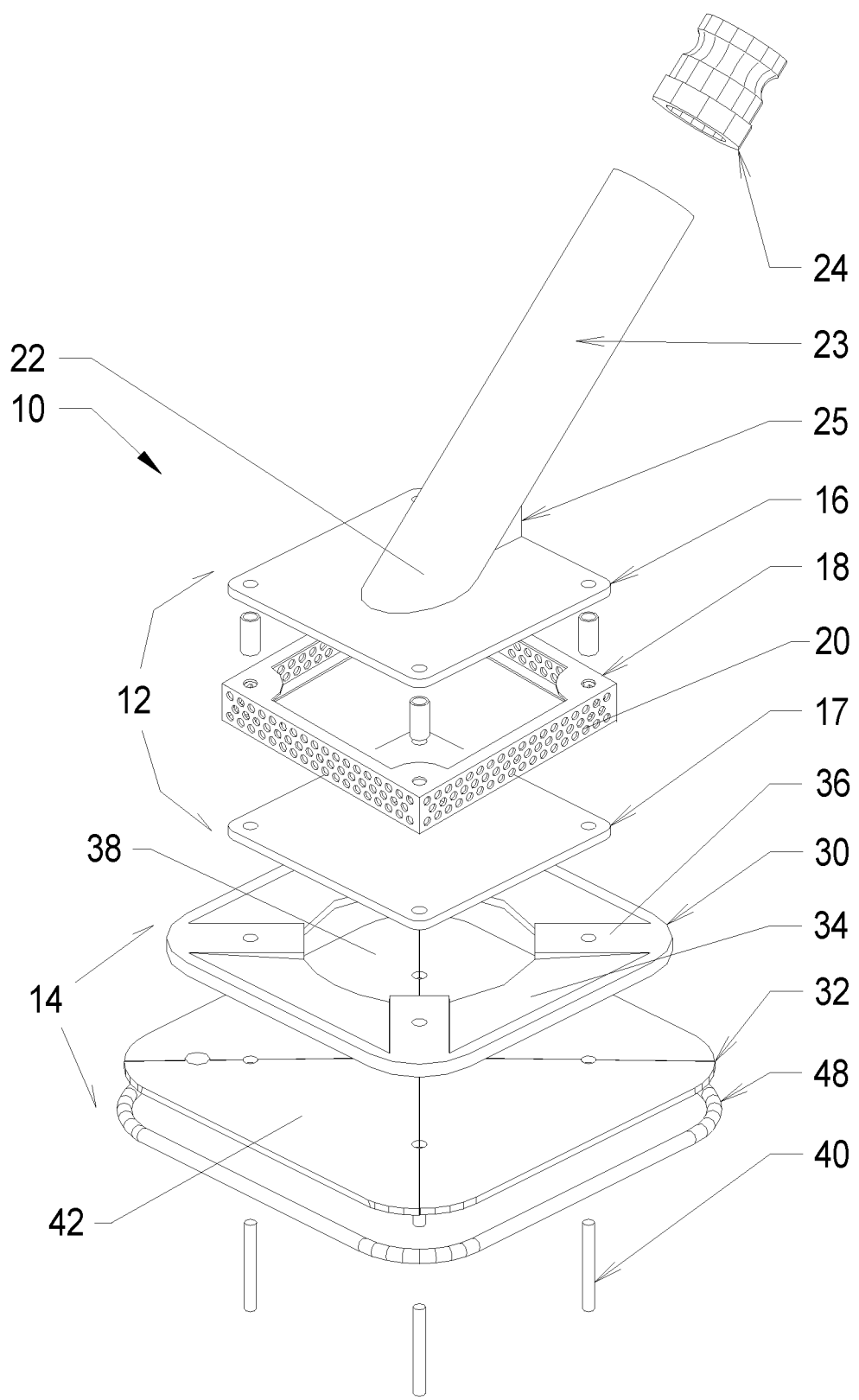
FIG. 1 is an explode perspective view of a suction nozzle.

A sump nozzle generally identified by reference numeral 10, will now be described with reference to FIG. 1 and FIG. 2. A variation modified for floatation will be described with reference to FIG. 3 and FIG. 4.

Figure 2:
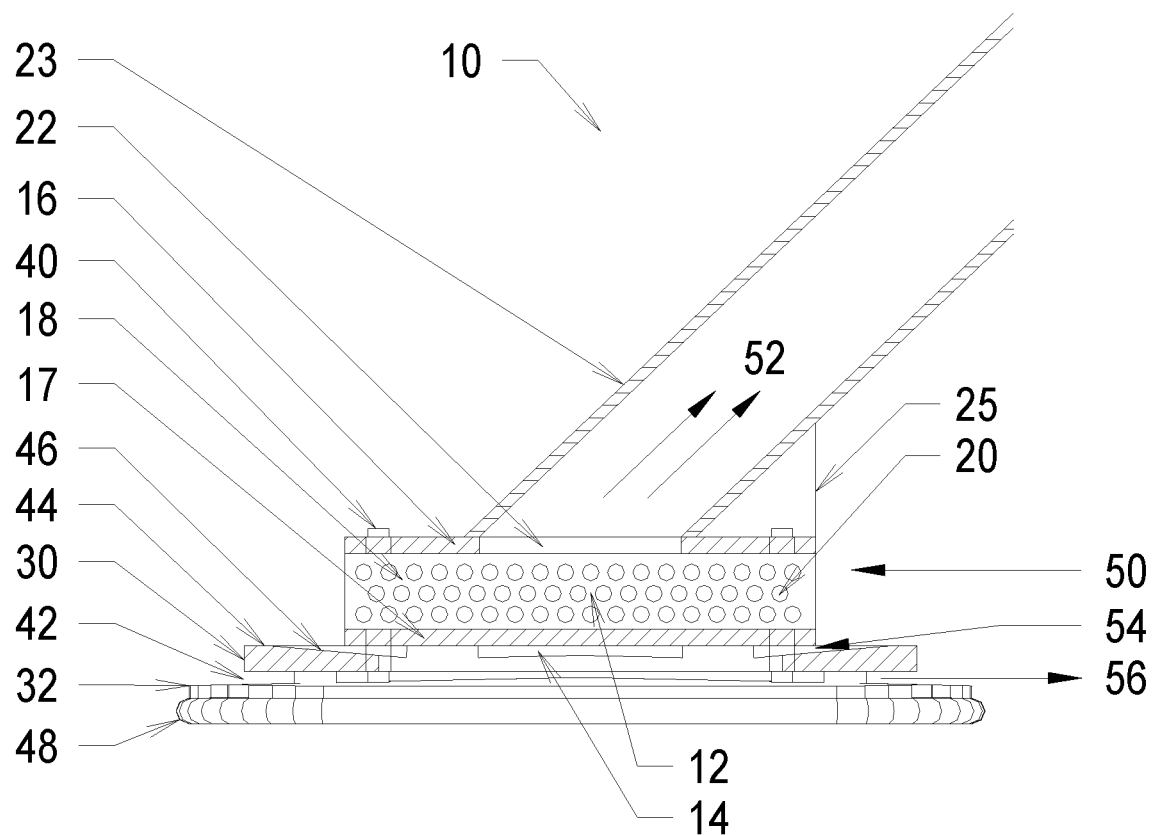
FIG. 2 is a side elevation view, in section of the suction nozzle of FIG. 1.

Structure and Relationship of Parts:

Referring to FIG. 2, suction nozzle 10 has a suction chamber 12 and an underlying sump 14.

Referring to FIG. 1, suction chamber 12 is defined by a chamber top 16, a chamber bottom 17 and a peripheral sidewall 18. Peripheral sidewall 18 has a plurality of inflow openings 20. It is preferred that inflow openings 20 be positioned in all directions around peripheral sidewall 18, so that suction chamber 12 draws evenly from all sides. Chamber top 16 having a suction opening 22 with a connective pipe 23 terminating with a hose coupling 24. A gusset 25 is provided between connective pipe 23 and chamber top 16 to provide additional strength. Referring to FIG. 2, hose coupling 24 enables a hose (not shown) from a vacuum source (not shown) to be connected to hose coupling 24 in order to provide suction to draw liquids through inflow openings 20 in peripheral sidewall 18 into suction chamber 12.

Referring to FIG. 2, sump 14 underlies suction chamber 12. Referring to FIG. 1, sump 14 has a sump top 30 and a sump bottom 32. Sump top 30 has sloped surfaces 34 positioned between support shoulders 36. Sloped surfaces 34 are inclined downwardly toward a central inlet 38. Sump bottom 32 is spaced from sump top 30 by spacers 40 with peripheral outlets 42 being defined along each edge between sump top 30 and sump bottom 32.

Referring to FIG. 2, when assembled chamber bottom 17 of suction chamber 12 is positioned upon support shoulders 36 on sump top 30 of sump 14. An extended portion 44 of sump top 30 extends past chamber bottom 17, providing a migration path for sediment and denser liquids, as will hereinafter be further described. Sloped surfaces 34 on sump top are in spaced relation to chamber bottom 17, thereby providing an entryway, generally indicated by reference numeral 46, on all sides under chamber bottom 17 into sump 14.

Referring to FIG. 1 and FIG. 2, it is preferred that sump bottom 32 has an underlying support ring 48.

Operation:

Referring to FIG. 2, suction nozzle 10 was originally developed for use in a containment pond that has an environmental liner. In preparation for use, a hose (not shown) from a vacuum source (not shown) is connected to hose coupling 24. Suction nozzle 10 is then lowered into the containment pond until underlying support ring 48 rests upon a bottom of the containment pond. Support ring 48 slides along the bottom of the containment pond. The smooth rounded surface of support ring 48 prevents the environmental liner from being punctured. Support ring 48 also prevents injury to the workers, if struck by suction nozzle 10. However, support ring 48 is non-essential where damage to an environmental liner or injury to workers is not applicable.

Referring to FIG. 2, when suction is applied to suction chamber 12, the suction tends to draw liquids through inflow openings 20 in peripheral sidewall 18 into suction chamber 12, as indicated by arrows 50. Liquids exit suction chamber 12 through suction opening 22, as indicate by arrows 52, passing along connective pipe 23 to hose coupling 24, into the hose (not shown) attached to hose coupling 24 and then into a tank (not shown) positioned at a suction source (not shown). Typically, a vacuum truck having a truck mounted tank is used as the vacuum source.

The chamber bottom 17 is devoid of openings and prevents the direct entry of sediment into suction chamber 12. However, particles and denser liquids are still drawn toward suction chamber 12. Fortunately, due to a difference in density, particles and denser liquids tending to migrate along extended portion 44 of sump top 30 which extends past chamber bottom 17, as indicated by arrows 54. As the particles and denser liquids migrate along sump top they are directed through entryway 46, down sloped surfaces 34; dropping through central inlet 38 into sump 14. The particles and denser liquid exit sump 14 through peripheral outlets 42 in response to continuous flow into sump 14, which pushes the accumulated particles and denser liquid out, as indicated by arrows 56.

Figure 3:
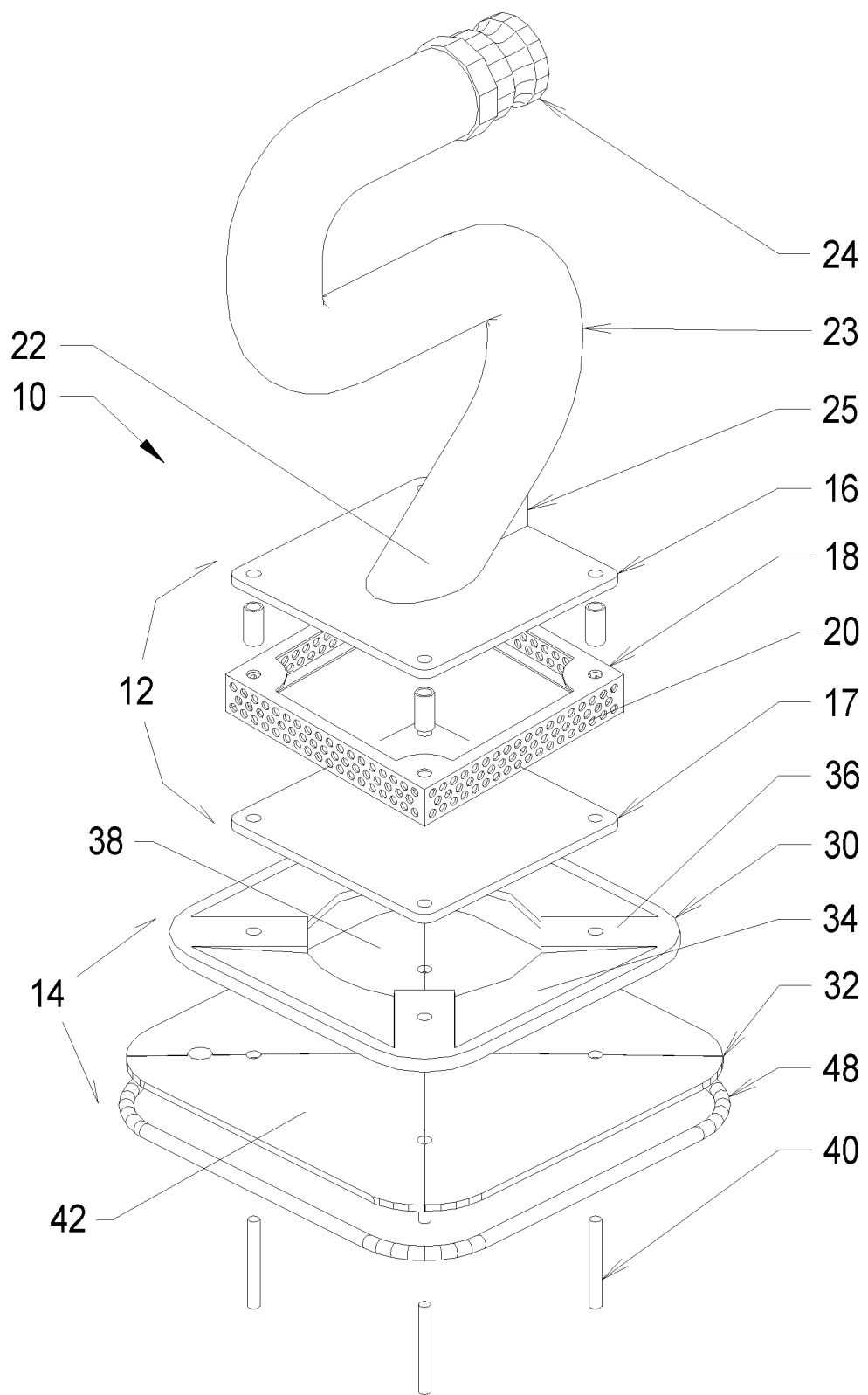
FIG. 3 is an exploded perspective view, of the suction nozzle of FIG. 1 modified for floatation
Figure 4:
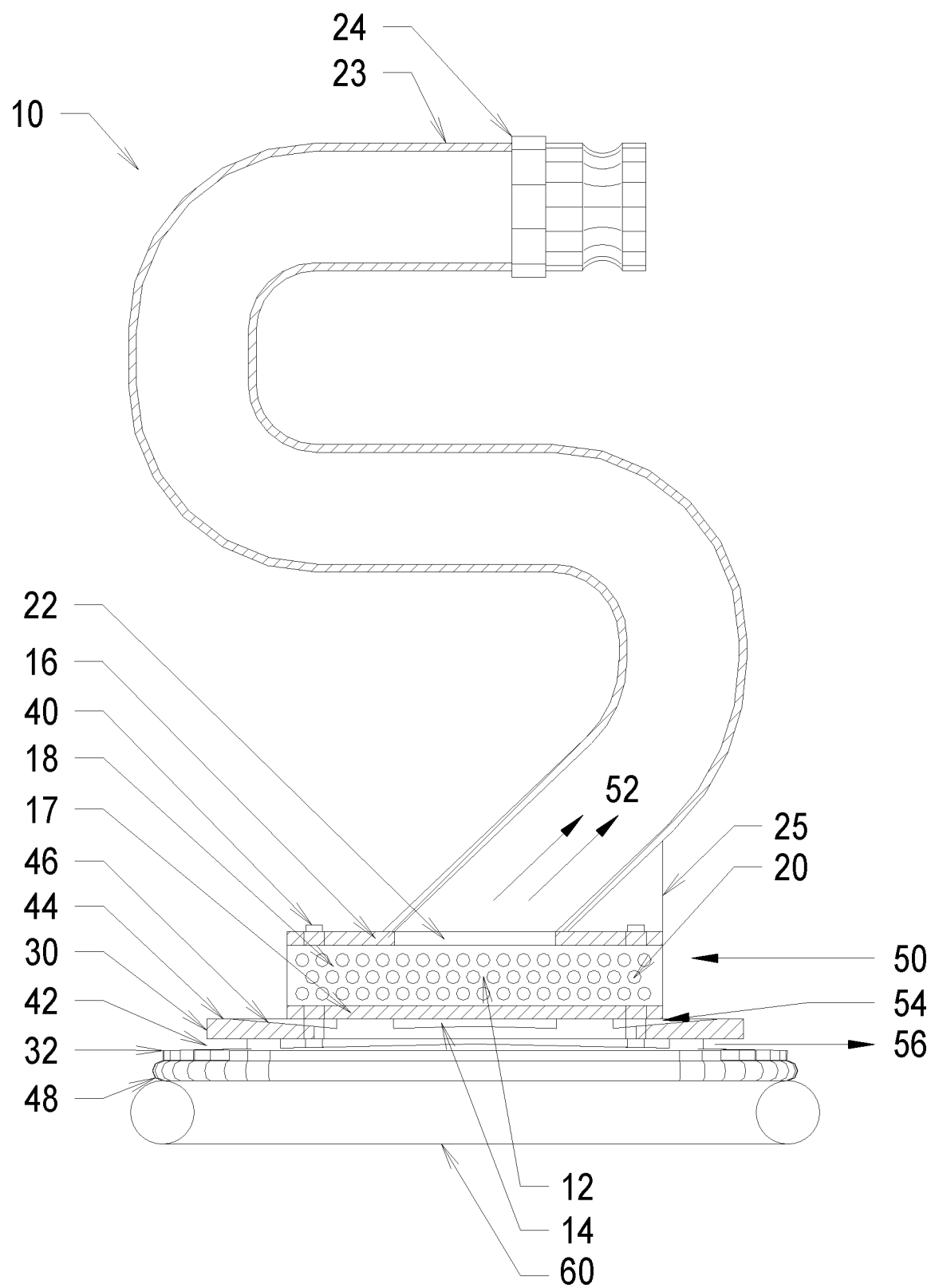
FIG. 4 is a side elevation view, in section of the suction nozzle of FIG. 3.

Variations:

As discussed above, suction nozzle 10 operates based upon a differences in density. Where there is a liquid of a first density, such as oil, floating on a liquid of a second density, such as water; suction nozzle 10 is capable of separating the liquids. Referring to FIG. 3 and FIG. 4, suction nozzle 10 has been equipped with a float collar 60. When a straight connective pipe 23 is use, the attachment of a hose to hose coupling 24 has been found to tip suction nozzle 10 at an angle when suction nozzle is floating with the assistance of float collar 60. For that reason, an "S" configuration connective pipe is used that is better able to take the weight of a hose and still maintain suction nozzle 10 in a horizontal orientation.

As described above, when suction is applied to suction chamber 12, the suction tends to draw oil through inflow openings 20 in peripheral sidewall 18 into suction chamber 12, as indicated by arrows 50. The oil exits suction chamber 12 through suction opening 22, as indicate by arrows 52, passing along hose coupling 24, into the hose (not shown).

As described above, suction still draws water toward suction chamber 12. Due to a difference in density, any water reaching suction nozzle 10 tends migrate along extended portion 44 of sump top 30 which extends past chamber bottom 17, as indicated by arrows 54. As the water migrates along extended portion 40 of sump top 30, the water passes through entryway 46, flows down sloped surfaces 34 and drops through central inlet 38 into sump 14. Water is pushed out of sump 14 through peripheral outlets 42 in response to continuous flow of water into sump 14, as indicated by arrows 56.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A suction nozzle, comprising:
a suction chamber defined by a chamber top, a closed chamber bottom and a peripheral sidewall, the peripheral sidewall having inflow openings, the top having a suction opening terminating with a hose coupling, whereby a hose from a vacuum source is connected to provide suction to draw liquids from a body of water through the inflow openings in the peripheral sidewall into the suction chamber;
a sump underlying the suction chamber, the sump having an outer edge, a sump top and a closed sump bottom, the sump top having sloped surfaces inclined toward a central inlet, the sump bottom being spaced from the sump top with peripheral outlets being defined along the outer edge between the sump top and the sump bottom;
the sump top extending past the chamber bottom thereby forming a migration path, the sump top being in spaced relation to the chamber bottom thereby providing a peripheral entryway into the sump, such that particles and denser liquids drawn toward the suction chamber tend to migrate along the sump top passing through the entryway, down the sloped surfaces and dropping through the central inlet into the sump without reaching the suction chamber, with the particles and denser liquid in the sump exiting the sump through the peripheral outlets back to the body of water in response to continuous flow into the sump.

2. The suction nozzle of claim 1, wherein the sump has an underlying float.

3. The suction nozzle of claim 2, wherein the hose coupling is S-shaped.

4. A suction nozzle, comprising: a suction chamber defined by a chamber top, a closed chamber bottom and a peripheral sidewall, the peripheral sidewall having inflow openings, the top having a suction opening terminating with a hose coupling, and a sump underlying the suction chamber, the sump being in spaced relation to the suction chamber bottom thereby defining an entryway into the sump, such that particles and denser liquids drawn toward the suction chamber pass through the entryway into the sump without reaching the suction chamber.

* * * * *